March 24, 1953 J. M. LUERS 2,632,233
CUTTING-OFF BLADE
Filed Feb. 19, 1952

INVENTOR.
John M. Luers
BY
Gerald J. Baldwin
Attorney.

Patented Mar. 24, 1953

2,632,233

UNITED STATES PATENT OFFICE 2,632,233

CUTTING-OFF BLADE

John M. Luers, Mount Clemens, Mich.

Application February 19, 1952, Serial No. 272,372

5 Claims. (Cl. 29—102)

This invention relates to improvements in cutting-off blades and refers particularly to blades which may be either of circular or flat form, and have a preformed cutting surface.

In my United States Patent No. 2,424,041, I disclosed a cutting-off blade having a preformed cutting surface including an inwardly and rearwardly disposed cutting face extending transversely from each lateral margin across one-half the width of the blade with one cutting face in advance of the other, and an undercut wall substantially parallel with the outer sides of the blade conecting the inner extremities of the cutting faces. However when the blade has to be wide, due to the large diameter of stock to be parted, it is necessary that the leading or advanced cutting face, which is usually positioned adjacent the portion of the stock being removed, must be sufficiently in advance of the other cutting face to provide rigid support for the portion being removed until the latter is severed. Thus the greater the diameter of the stock being parted the greater this advance must be. Again in order to equalize the pressure exerted when the blade is in operation the inclination of the two cutting faces to the axis of the work must be the same though in opposite directions, and the effective cutting length of the two faces must also be the same. Consequently the vertical distance between the inner extremities of the cutting faces must be proportionate to the diameter of the stock to be parted. It is therefore evident that when stock of quite large diameter is being parted the chips removed by the leading cutting face are confined on opposite sides between the rear face of the portion of the stock being removed and a relatively high wall formed parallel with the said rear face at the inner margin of the said leading cutting face. If the wall thus formed is high enough the chips thus confined are held against lateral expansion as they burst from the stock and cause excessive heating of the blade which quickly results in damage to the latter. For that reason there is a limit of width within which the blade described in the aforesaid patent is really efficient.

It is an object of this invention to provide a cutting-off blade having a preformed cutting surface divided transversely into a plurality of cutting faces relatively so arranged that lateral expansion of the chips removed from stock being cut off by each is permitted. For if the chip is restricted the chips jam and clog in the cut and cause excessive heating of the blade.

Another object of the invention is to provide a cutting-off blade having a preformed cutting surface including three cutting faces, one inclined in each direction to the axis of the work and a third extending from one side of the blade to one of the inclined faces; the third cutting face being substantially parallel with the work axis. Moreover the adjacent extremities of each pair of cutting faces are so connected to one another that parallel walls are not formed in the stock to confine chips cut by any one of the cutting faces and thus prevent lateral expansion of the chips as they burst from the stock.

Having thus briefly and broadly stated some of the objects and advantages of the invention I will now describe it in detail with the aid of the accompanying drawing, in which.

The blades are shown enlarged for the sake of clarity and the angle of the cutting faces somewhat increased.

Figures 1, 2:
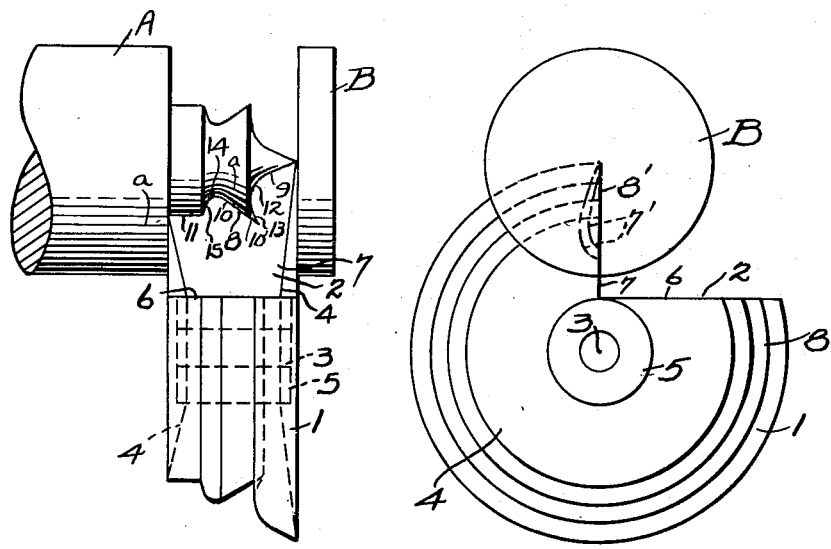
Figure 1 shows an end view of a circular blade made according to the invention.
Figure 2 is a side view thereof.

Referring to Figures 1 and 2, 1 designates a circular blade having a notch 2 formed in its periphery. The blade is centrally apertured at 3 for mounting it upon a holder—not shown. The opposite sides 4 of the blade are inwardly inclined from the periphery to provide clearance, and around opposite ends of the aperture 3 parallel bosses 5 may be formed to the outer peripheries of which the inwardly inclined sides 4 extend. Extending circularly around the periphery of the blade from one side 6 of the notch 2 to the opposite side 7 of the latter a preformed cutting surface is provided. A cutting edge 8' is formed across the junction of the side 7 with the cutting surface 8, and in order to sharpen the blade it is merely necessary to grind the side 7 as indicated at 7'.

The cutting surface 8 consists essentially of a cutting face 9 inclined inwardly and rearwardly from one side of the blade at about 20 degrees to the axis of the aperture 3, a cutting face 11 extending inwardly parallel with the said axis from the opposite side of the blade, and an intermediate cutting face 10 inclined at the same angle to the axis as the cutting face 9 but in the opposite direction. The cutting face 9, which projects farthest forward, is so positioned relative to the cutting face 11 that an imaginary line a projecting from the inner extremity of the cutting face 9 and in alignment therewith would intersect the outer extremity of the said cutting face 11. This imaginary line a would also intersect the forwardly projecting extremity of the intermediate cutting face 10 which is adjacent and forwardly spaced from the inner extremity of the cutting face 11. Projecting from the rear extremity of the cutting face 9 is a radius portion 12 which is rearwardly curved to merge with an undercut wall 13 which terminates at the rear in an inwardly inclined extension 10' of the intermediate cutting face 11. Projecting from the forward extremity of the intermediate cutting face 10 is another radius portion 14 which is rearwardly curved through a lesser angle than the radius portion 12 and merges with a connecting wall 15 which extends rearwardly at an angle of approximately 80 degrees to the axis of the aperture 3 toward the side of the blade from which the cutting face 11 extends and joins the inner extremity of the said face 11.

It will be noted that the effective lengths of the two cutting faces 9 and 10, which are inclined at the same angle to the axis of the aperture 3 and also the axis of the work but in opposite directions, are the same length so that the lateral pressures exerted when the blade is in operation are equalized. The radius portion 12 is of sufficient length to cause breakage of chips removed by it from the chips removed by the cutting face 9 itself, thus room for lateral expansion of the chips as they burst from the stock A is provided and clogging or jamming of the chips is prevented. Similarly room for lateral expansion of the chips removed from the stock A by the cutting face 10 is also provided due to the location and arrangement of the radius portion 14 as the chips cut by the latter break away from those removed by the cutting face 10. The inclined connecting wall 15 exerts only slight lateral pressure on the work as it extends for only a very short distance across the cutting surface, and the chips cut by it break intermediately of their width due to the steep inclination of the said wall to the axis of the stock; and obviously the chips removed by the cutting face 11 are not laterally restricted.

By inclining the cutting faces 9 and 10 at approximately 20 degrees to the work axis they are positioned to do most efficient cutting; and by placing the cutting face 11 relative to the cutting face 9 so that the imaginary line a passes through the outer extremity of the face 11 and so that the said line a also passes through the outer extremity of the intermediate cutting face 10, it is insured that sufficient material if left, irrespective of the width of the blade, to rigidly support the portion B of the stock until it is severed.

Figures 3, 4:
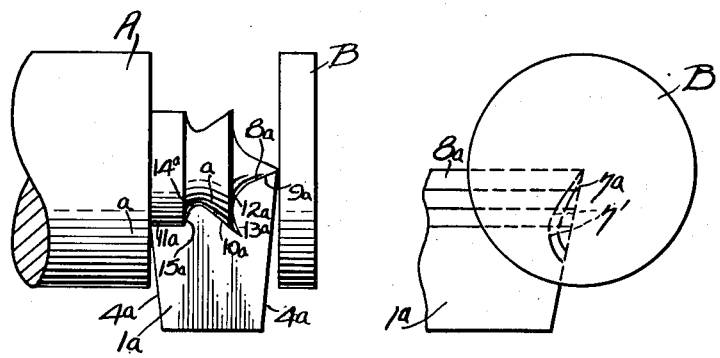
Figure 3 is a modification showing an end view of a flat blade.
Figure 4 is a side view thereof.

In the modification shown in Figures 3 and 4, the blade 1a is flat and has a preformed cutting surface 8a formed along one edge face. The cutting surface 8a is identical in cross sectional form to the cutting surface 8 above described, and includes cutting faces 9a, 10a and 11a, radius portions 12a and 14a, an undercut wall 13a and an inclined wall 15a also relatively disposed exactly as hereinbefore set forth. A cutting edge 8a' is formed across the junction of one extremity of the cutting surface 8a with one end 7a of the blade which is disposed at less than 90 degrees to the said cutting surface to provide clearance beneath the cutting edge; and the opposite sides 4a of the blade are downwardly and inwardly inclined from the cutting surface 8a also for purposes of clearance.

While in the foregoing the preferred embodiments of the invention have been described and shown, it is understood that alterations and modifications may be made thereto provided the said alterations and modifications fall within the scope of the appended claims.

What I claim is:

1. A cutting-off blade having a preformed cutting surface of uniform cross section throughout its length, one end of the blade extending angularly from one extremity of the cutting surface so that a cutting edge is formed across said extremity, the cutting surface including three transverse cutting faces, one cutting face being inwardly and rearwardly inclined from one side of the blade, an intermediate cutting face inclined in the opposite direction to the first named face and having its rear extremity rearwardly spaced from and adjacent the inner extremity of the first named face, and a flat face extending inwardly from the other side of the blade and behind the forward extremity of the intermediate cutting face, a radius portion merging with and rearwardly curved from the inner extremity of the first named cutting face whereby the inner extremities of chips removed by that cutting face are split to permit lateral chip expansion, a rearward wall extending from the radius portion to the rear extremity of the intermediate face, another radius portion merging with and extending rearwardly from the forward extremity of the intermediate face whereby the forward extremities of chips removed by said intermediate face are split to permit lateral chip expansion, and an extension wall connecting the rear of the last named radius portion with the inner extremity of the flat cutting face.

2. The combination in claim 1, wherein the first named and the intermediate cutting faces are the same length and inclined at the same angle to the flat face but in opposite directions.

3. The combination in claim 1, wherein the rearward wall is inclined to form an undercut beneath its radius portion, and the extension wall is rearwardly inclined toward the side of the blade from which the flat face extends.

4. The combination set forth in claim 1, wherein the intermediate cutting face and the flat face are so positioned relative to the first named cutting face that the forward extremity of said intermediate face and the outer extremity of said flat face are both so positioned as to be intersected by an imaginary line forming a rearward extension of the first named cutting face.

5. A cutting-off blade having a preformed cutting surface of uniform cross section throughout its length extending along one edge face, one end wall of the blade extending angularly from one extremity of the cutting surface whereby a cutting edge is formed across said extremity, said cutting surface including three cutting faces one of which is inwardly and rearwardly inclined from one side of the blade and thereby angularly disposed to the axis of stock to be parted, a flat cutting face extending inwardly from the opposite side of the blade and thereby disposed parallel to said stock, said flat face being positioned rearwardly relative to the first named cutting face, and an intermediate cutting face which is inclined at the same angle to the stock as the first named cutting face but in the opposite direction, the forward extremity of said intermediate cutting face being adjacent and forwardly spaced relative to the flat cutting face and its rear extremity being adjacent and rearwardly spaced relative to the inner extremity of the first named cutting face, a radius portion merging with and extending rearwardly from the inner extremity of the first named cutting face, an undercut wall extending rearwardly from said radius portion to the inner extremity of the intermediate cutting face, another radius portion merging with and extending rearwardly from the forwardly projecting extremity of the intermediate cutting face, and another wall extending rearwardly from the last named radius portion to the inner extremity of the flat cutting face, said other wall being rearwardly somewhat inclined toward the side of the blade from which said flat face extends.

JOHN M. LUERS.

No references cited.